UNITED STATES PATENT OFFICE.

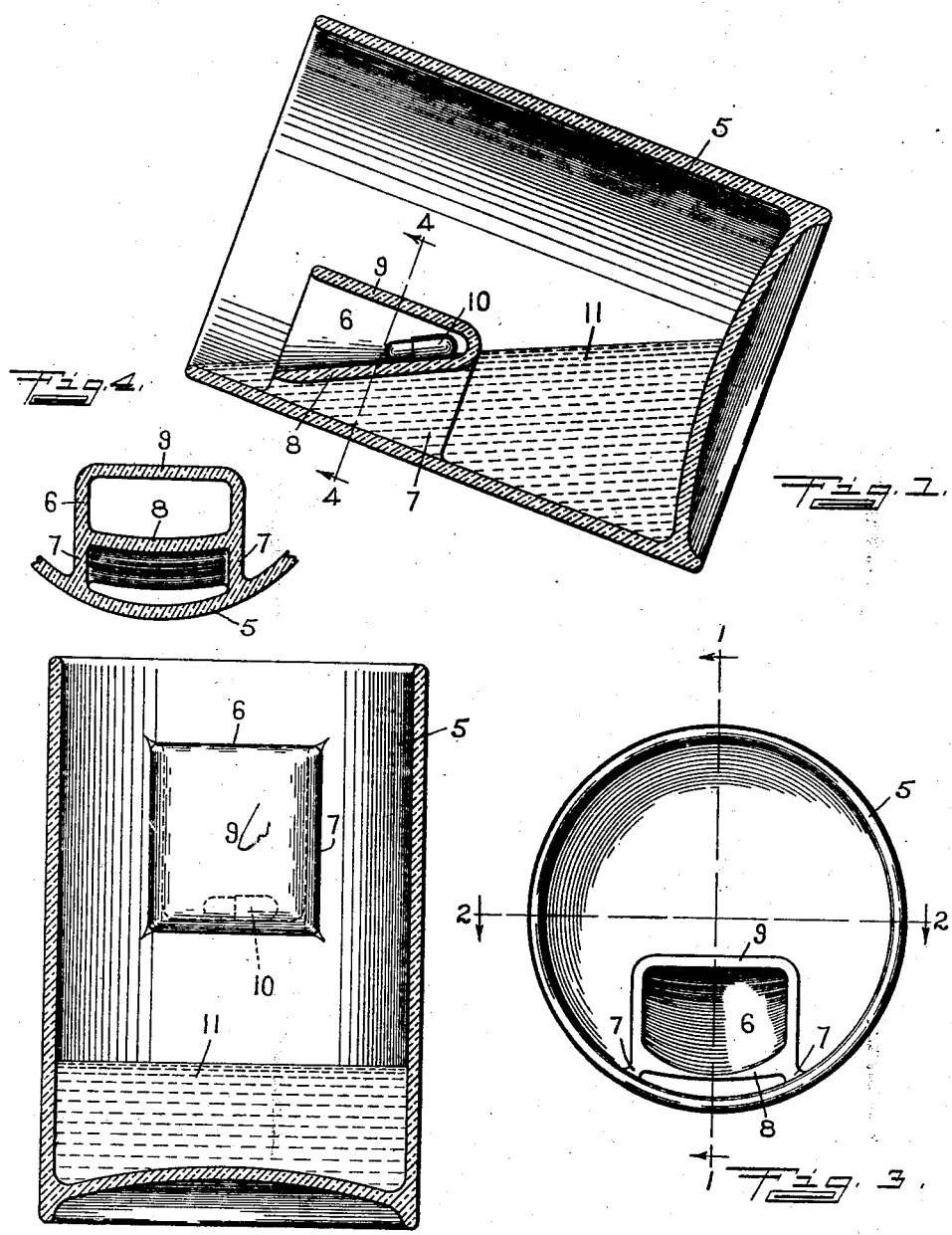

FRANCIS N. POULALION, OF DES MOINES, IOWA, ASSIGNOR TO H. S. MAGEL, OF OMAHA, NEBRASKA.

DEGLUTITORY CUP.

1,275,467. Specification of Letters Patent. Patented Aug. 13, 1918.

Application filed January 7, 1916. Serial No. 70,753.

*To all whom it may concern:*

Be it known that I, FRANCIS N. POULALION, a citizen of the United States, and a resident of Des Moines, in the county of Polk and State of Iowa, have invented certain new and useful Improvements in Deglutitory Cups, of which the following is a specification.

My invention relates to specially formed drinking cups or receptacles for beverages, and it is the object thereof to provide a simple and convenient device for facilitating the swallowing or deglutition of medicines and the like, adapted for use with pills, capsules, powders and other solids, as well as being especially adapted for administering oils or any liquid medicinal materials that are nauseous or disagreeable to the taste. The described objects are attained by the use of a suitable receptacle or holder for the medicinal material, arranged in connection with another receptacle or vessel containing a carrier-liquid or vehicle, the two receptacles being so correlated that their contents may be simultaneously poured into the mouth, with the medicinal agent surrounded by the vehicle or carrier-liquid, thus enabling the one material to be swallowed without coming into contact with the tongue or other parts of the mouth, and, in the administration of solids, furnishing a liquid medium for washing the same down the throat.

In the accompanying drawings Figure 1 is a longitudinal section of a device embodying my invention, the section being on the plane of the line 1—1 of Fig. 3, Fig. 2 is a sectional view of the same on the plane of the line 2—2 of Fig. 3, Fig. 3 is a plan view of the article, and Fig. 4 is a detail transverse section on the plane of the line 4—4 of Fig. 1.

In the illustrated embodiment of my invention there is provided an outer vessel or cup 5, preferably made of glass, and being substantially identical in form and size with an ordinary tumbler or water-glass. Within said outer receptacle there is a smaller receptacle or holder which is arranged in proximity to one side of the outer receptacle near the top, or adjacent to the rim thereof. In the structure shown, the inner receptacle or holder is made of the same material as the outer cup, being integral therewith, and the main body 6 of the inner receptacle being connected with the adjacent wall of the cup 5 by two parallel vertical ribs 7 of which the thickness is uniform with that of the sides or walls of the receptacles. The outer wall 8 of the holder 6 is inclined relatively to the adjacent wall of the cup 5, being farthest therefrom at its lower end, so that between the adjacent walls of the two receptacles there is formed a wedge-shaped vertical opening which is widest at its lower end and is closed at the sides by the ribs 7. The opposite or inner wall 9 of the holder 6 may be parallel with the walls of the cup 5, so that the vertical sectional form of the space inclosed by the holder 6 is also approximately wedge-like in form, as shown in Fig. 1. The outer wall 8 of the holder 6 is also preferably curved transversely at its upper end, as shown clearly in Figs. 3 and 4, so that when the device as a whole is tilted to an inclined position, as in Fig. 1, said curved wall 8 will form a centrally-depressed trough which will tend to cause any material that may be contained within and flowing from the holder to be directed toward the central vertical plane which is coincident with the line 1—1 of Fig. 3. For most ordinary uses the capacity of the holder 6 should be about one fluid-ounce, and the same may be graduated, if desired, to show its capacity in fluid-drams, cubic centimeters, or other convenient units of measurement such as are employed for the dosage of medicines.

In the use of the cup the medicinal material or the like is placed within the inner receptacle or holder 6, and a suitable quantity of water or other desired liquid 11 is placed within the outer receptacle 5. The cup is then tilted toward the side to which the inner receptacle 6 is attached, as shown in Fig. 1, being held to the lips in the same manner as an ordinary tumbler or water-glass when drinking therefrom, and the contents of the two receptacles poured into the mouth and swallowed. The vehicle or carrier-liquid 11 flows through the wedge-shaped opening between the ribs 7, passing beneath the holder 6, and a further quantity of said liquid 11 passes around the opposite sides of the ribs 7 and flows in around the sides and over the top of the material from the holder, so that when the material from the holder passes into the mouth it is substantially surrounded by the vehicle or carrier-liquid, and the surfaces of the mouth are flooded and protected by the latter. The inclination, relatively to the walls of the outer receptacle, of the wall 8 of the holder, along which the material therefrom passes during the tilting of the vessel, insures the emptying of the holder while a portion of the carrier-liquid is still contained in the outer receptacle, so that in passing through the mouth the medicinal material from the holder may be both preceded and followed by portions of the carrier-liquid, as well as surrounded laterally thereby.

It will be seen that the described mode of operation or use of the vessel is equally applicable to liquids contained in the holder 6, or to a solid substance such as the capsule 10 represented in the drawing, since any solid body or bodies held in the inner receptacle will roll or slide down the inclined and transversely-curved wall 8 in essentially the same manner in which a liquid would flow along the same. It will also be obvious that various changes and modifications of the described structure may be made without departing from the spirit of my invention, the essential characteristics of which are as hereinafter claimed.

Now, having described my invention, what I claim and desire to secure by Letters Patent is:

1. In an article of the class described, a liquid-holding cup having substantially vertical walls, a pair of spaced vertical ribs extending inwardly from one side of said cup near the top thereof, and a secondary receptacle carried by and connecting the inner edges of said ribs and being thereby held in spaced relation to said side of the cup and forming a vertical liquid-passage between said ribs, for the purpose set forth.

2. An article of the class described comprising an outer cup and a receptacle of greater depth than width positioned within said cup below the rim and adjacent to but spaced from one side thereof, said receptacle opening toward the rim of the cup, and means for connecting the cup and receptacle fixedly in the relation set forth, said means being substantially unobstructive of a vertical space around the receptacle between the same and the sides of the cup.

FRANCIS N. POULALION.

Copies of this patent may be obtained for five cents each, by addressing the "Commissioner of Patents, Washington, D. C."